(No Model.) 4 Sheets—Sheet 2.
F. P. HUYCK.
REVERSIBLE FRICTION CLUTCH.
No. 275,388. Patented Apr. 10, 1883.
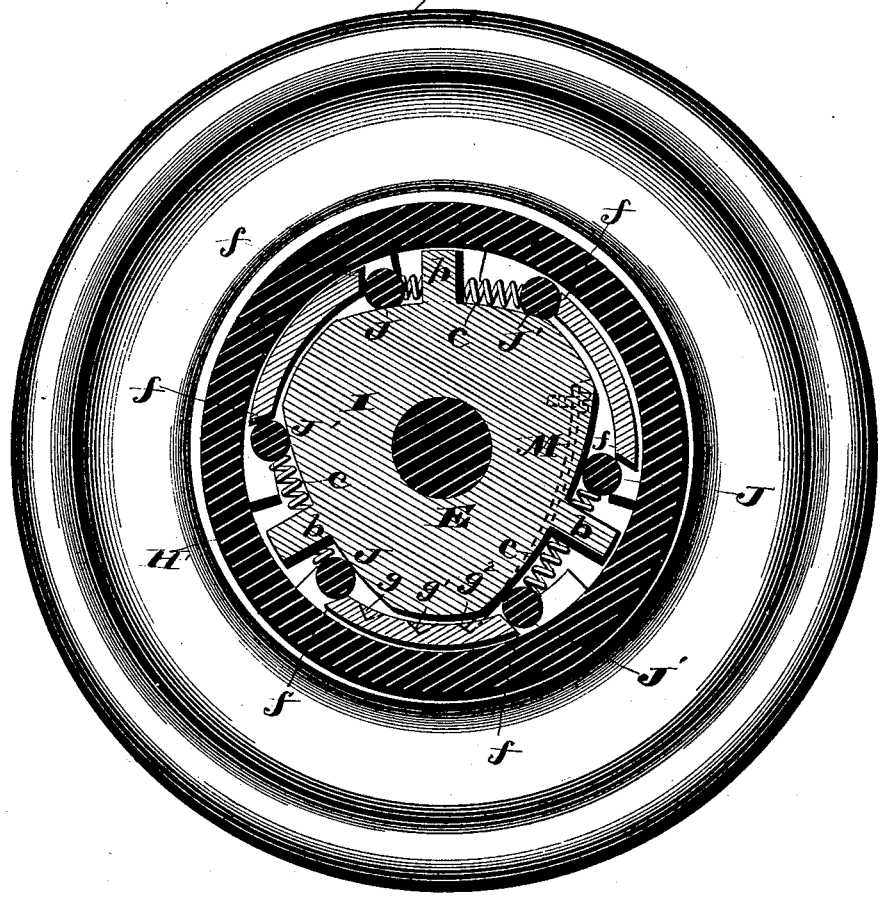
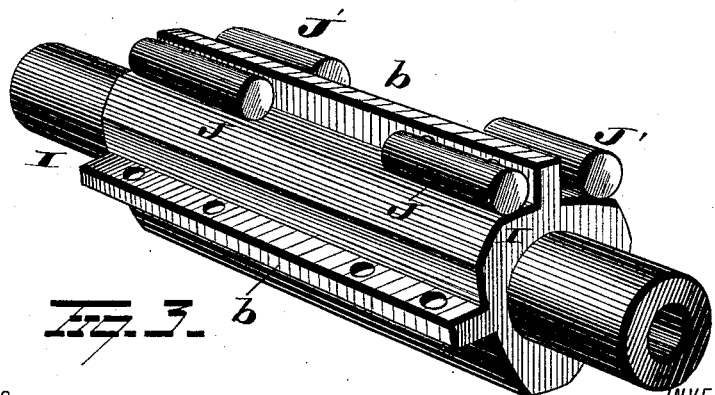
WITNESSES
R. J. Nottingham
Geo. F. Downing
INVENTOR
Francis P. Huyck
By H. A. Seymour
Attorney

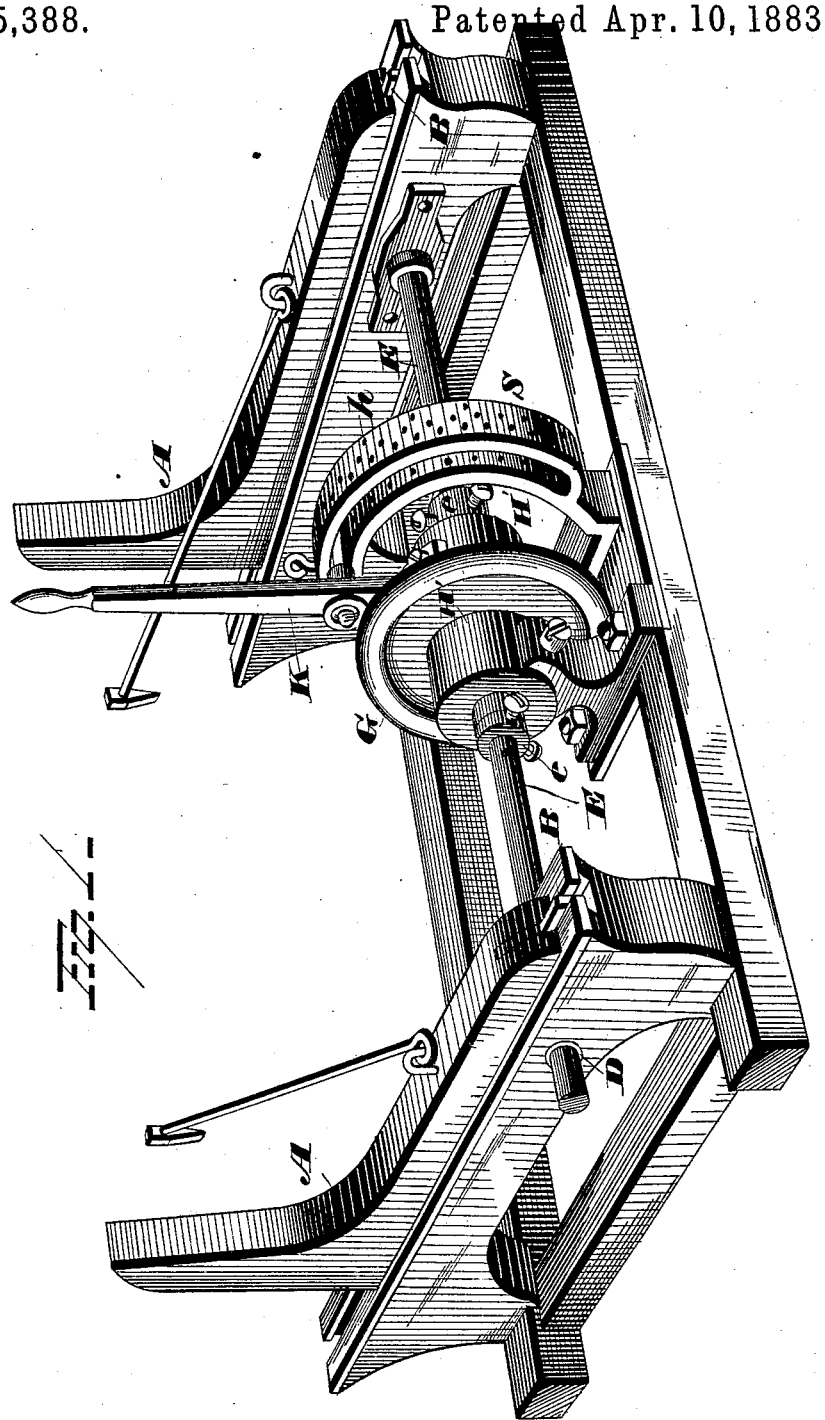

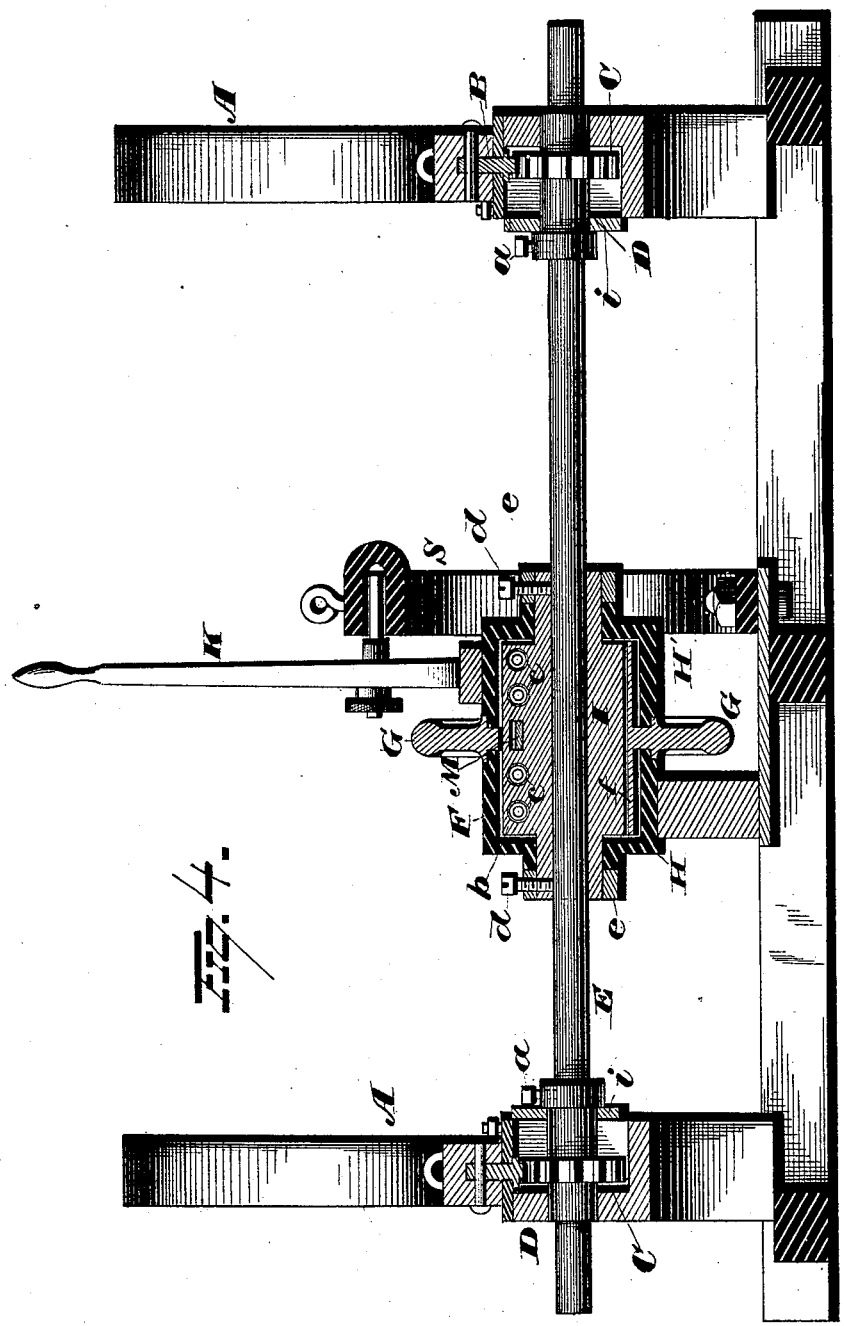

(No Model.)  4 Sheets—Sheet 4.
F. P. HUYCK.
REVERSIBLE FRICTION CLUTCH.
No. 275,388.  Patented Apr. 10, 1883.
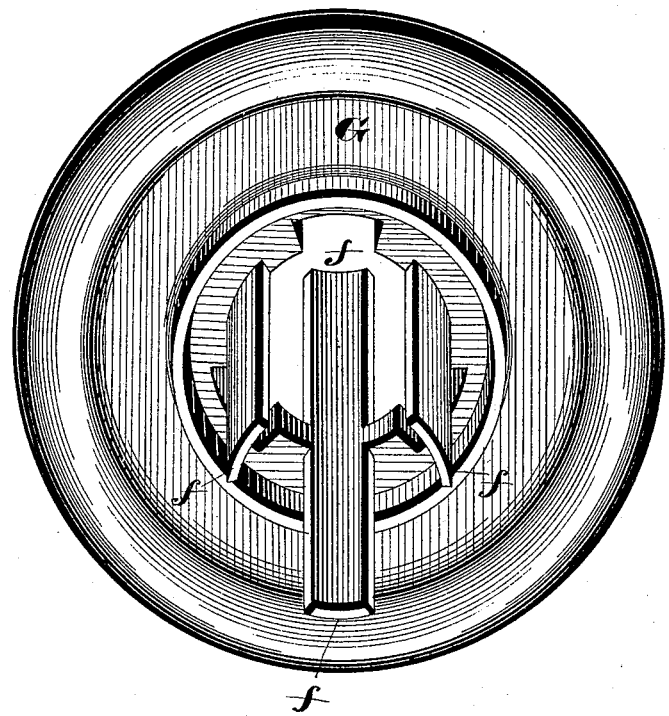

UNITED STATES PATENT OFFICE.

FRANCIS P. HUYCK, OF SWANTON, OHIO, ASSIGNOR OF ONE-HALF TO J. E. HALL, OF SAME PLACE.

REVERSIBLE FRICTION-CLUTCH.

SPECIFICATION forming part of Letters Patent No. 275,388, dated April 10, 1883.

Application filed November 16, 1882. (No model.)

*To all whom it may concern:*

Be it known that I, FRANCIS P. HUYCK, of Swanton, in the county of Fulton and State of Ohio, have invented certain new and useful Improvements in Reversible Frictional Clutches; and I do hereby declare the following to be a full, clear, and exact description of the invention, such as will enable others skilled in the art to which it pertains to make and use the same.

My invention relates to an improvement in reversible friction-clutches, and is designed more particularly for simultaneously moving all the knees of a saw-mill head-block either forward or backward, as necessity demands; and with these ends in view my invention consists in certain details in construction and combinations of parts, as will be more fully explained, and pointed out in the claims.

In the accompanying drawings, Figure 1 is a perspective view of a saw-mill head-block embodying my invention. Fig. 2 is a transverse section through the shaft and clutch. Fig. 3 is a view in perspective of the clutch and shaft. Fig. 4 is a longitudinal section of the clutch, and Fig. 5 is a detached view of the hand-wheel.

For the sake of convenience, I will describe my improvement in connection with the setworks of a saw-mill; but I would have it understood that I do not limit the application of my improvement to any particular kinds of machinery, but consider myself at liberty to use it on any and all kinds of tools or machinery where it can be employed to an advantage.

A represents the knees of an ordinary headblock, each provided on the lower bearing-face with the inverted-T-shaped rack-bar B, which latter are adapted to mesh with the pinion C, rigidly secured to the sleeves D. These sleeves D are journaled in suitable bearings, *i*, and are adapted to be moved longitudinally in the said bearings, so as to move the pinions out of mesh with the rack-bars when desired.

E is the main shaft, extending throughout the length of the head-block and through the sleeves D, the latter being rigidly secured to the shaft by the set-screws *a*. Thus it will be seen that when the shaft E is turned in either direction the knees are simultaneously moved either forward or backward, as the case may be. This shaft E is also passed centrally through my clutch F, which latter can be placed at any convenient point on the shaft, so as to be within easy reach of the operator, and is adapted by its peculiar construction to turn the shaft in either direction, as necessity demands. This double clutch, shown in the drawings, is composed of the hand-wheel G, the two shells or cases H and H', and the hub I, together with the projections, rollers, and springs, to be hereinafter described. The hub I passes centrally through the hand-wheel G, and is provided on its perimeter with one or more pairs of reverse inclined planes, on which the friction-rolls J J' rest and move, and one or more ribs, *b*, which serve to hold the springs *c* in position, and also limit the movement of the rolls. Each rib *b* is situated at the base of two upward inclines, and is perforated at one or more points for the passage of the spiral springs *c*, the opposite ends of which bear respectively on rolls situated on opposite sides of the ribs. Thus it will be seen that the tension of each spring is equally divided between two rolls, and when one roll is moved away from its rib the spring gives or moves with it and allows the other roller to seek a lower position, or, that is to say, seek a position nearer the longitudinal center of the hub, so as to prevent a locking of the parts. One half of the rolls under the shell H' are for the purpose of moving the main shaft in one direction, and the other half of the rolls are for the purpose of moving it in the other. Thus the rolls J are for moving the shaft to the right, and the rolls J' for moving it to the left, and when one half is in engagement the other half is at rest. The opposite extremities of the hub I are rounded off, and are provided with one or more holes for the passage of binding-screws *d*, which latter also pass through and secure the collar *e* in position, and the latter in turn holds the shells in proper position and prevent all lateral movement thereof. It is evident, however, that I can key the hub to the shaft by feather and groove, or by any of the well-known means for accomplishing the same end, the collar and binding-screws in this instance being shown simply as one means for accomplishing the desired result.

In a double clutch similar to the one shown in the drawings, the hand-wheel G is preferably placed over the center of the hub between the casings H H' and the rolls in the respective casings, and is provided on both sides with the lateral projections $f$, rigidly secured thereto or formed integral therewith. As many lateral projections are employed as there are ribs $b$, and each projection is adapted to rest between two rolls. When the parts are placed in position as above, each roll is situated between a rib, $b$, and a projection, $f$, and the springs $c$ connect the adjacent rolls J J' on the opposite sides of a rib. This hand-wheel G is free to move a limited distance without moving the hub; but when so moved the projections $f$ are also moved in the same direction, and consequently forces either the rolls—J, for instance—down the inclines, or in such a low position as not to interfere with shell or shells and produce a friction thereon, while the springs $c$ force the other rolls, J', up the inclines, which rolls produce sufficient friction to bind the hub I and shell H' together when the latter is moved to the left, but allows the shell to be moved to the right without interference. Thus it will be seen that the set of rolls J engage with the shell H when the latter is moved by the operating-lever K to the left, for the purpose of moving the knees inward, and the rolls J' with the shell when the latter is moved to the right, for the purpose of moving the knees outward. When the hand-wheel is so turned as to bring the projections half-way between two ribs, the shell or casing is free to be moved in either direction without becoming wedged to the hub, as the lateral projection of the hand-wheel prevents the rolls from rising up the inclined planes sufficiently far to engage the shells or casings.

As the hand-wheel is provided with the reversing mechanism, and is loosely placed on the hub, it is necessary to provide means for preventing the wheel from accidentally turning on the hub. This wheel can, however, only turn independently on the hub a distance equal to the distance between two ribs $b$, minus the width of one lateral projection $f$ and the thickness of two rolls; but this limited distance is sufficient to reverse the movement of the parts, as heretofore described. To prevent this movement I have secured one end of a spring-catch, M, to the hub I in a position immediately under the hand-wheel. The opposite end of this spring-catch is adapted to engage with one of the three notches $g\, g'\, g^2$, formed in one of the lateral projections immediately under the hand-wheel. When the end of the catch is in the notch $g^2$ the parts are in position for moving the shaft to the right. When the end of the catch is in the notch $g$ the parts are in position for moving the shaft to the left, and when the end of the catch is in the central notch, $g'$, the rollers are forced by the lateral projections to positions below the casing or shell, and consequently do not interfere therewith when moved in either direction.

To illustrate the operation of the double clutch, I will suppose the end of the spring-catch to be in the notch $g^2$, and it is desired to turn the main shaft E to the right. The handle is grasped with one or both hands and moved backward and forward. As the handle is rigidly secured to the shell H it (the shell) also partly turns backward and forward, and during the forward movement engages the rollers J and turns the hub I and shaft E with it. During its backward movement the rollers J are moved inward to a lower position and allow the shell to be turned back without wedging it to the hub. Now, if it is desired to reverse the motion and turn the shaft to the left, the hand-wheel is turned to the left until the end of the spring-catch M enters the notch $g$. This motion of the hand-wheel (through the intervention of the lateral projections $f$) moves the rollers J in toward the ribs $b$, nearer the center of motion, and the rollers J' outward, toward the casing H'. The handle is moved as before, but the rollers wedge themselves between the hub and casing during the backward movement, and not during the forward motion, as in the previous instance.

In the double clutch shown in the drawings the shell H is stationary and the shell H' movable. In this instance the shell H acts as a stop and prevents the shaft from revolving in the wrong direction while operating the lever; but, if desired, I can make both shells movable, and connect them by gears or other mechanical equivalents, so that they will move in opposite directions, and get a continuous rotation of the shaft instead of an intermittent movement, as heretofore explained.

In a single reversible clutch constructed on this principle only one movable shell with its inclosed rolls is employed. The hand-wheel is made like the one shown, excepting the lateral projections thereon, which latter only extend out from one side thereof. If desired, motion can be imparted to the machine direct from the hand-wheel G without the intervention of a lever.

S is a guide formed in the arc of a circle and provided with a guide-slot, in which the finger of the operating-lever works. This guide is provided with a series of graduated notches and pin-holes, $h$, into which stop-pins are introduced. By means of the graduations and stop-pins the knees of the head-block can be moved a given distance with ease and dispatch.

My improvement is susceptible of many slight changes and alterations, and is also adapted to be used for many different purposes; and hence I would have it understood that I do not limit myself to the exact construction of parts shown and described, nor the use of the device to any particular class of machines, but consider myself at liberty to make such changes and alterations therein as fairly fall within the spirit and scope of my invention.

Having fully described my invention, what I claim as new, and desire to secure by Letters Patent, is—

1. In a friction-clutch, the combination, with a hub having a series of double inclines and ribs situated at the bases of the said inclines, of rolls adapted to move on the incline, springs for moving the said rolls, a case covering said hub, rolls, and springs, and reversing mechanism for changing the position of the rolls.

2. In a friction-clutch, the combination, with a hub having a series of double inclines and ribs situated at the bases of the said inclines and provided with one or more transverse holes or openings, of the rolls placed as described, springs passing through the transverse holes in the ribs and bearing against the rolls, a shell or casing covering the hub, and a hand-wheel loosely placed on the said hub and provided with lateral projections each of which rests between two rolls and operates as described.

3. In a friction-clutch, the combination, with a hub having a series of double-inclined planes, ribs situated at the bases of the inclines, rolls adapted to rest and move on the inclines, and springs passing through the ribs and exerting a pressure on the rolls situated on opposite sides of the said ribs, of a shell or casing loosely placed over the hub and rolls, a hand-wheel provided with lateral projections each of which rests between two rolls, and means for holding the hand-wheel and hub in proper relative position, all of the above parts adapted to operate as described.

4. In a reversible friction-clutch, the combination, with a hub constructed as described, the rolls and springs, and the spring-catch, of the shell or casing H', the hand-wheel provided with the lateral projections, and the notches $g$ $g'$ $g^2$, all of the above parts combined and adapted to operate as described.

5. In a double reversible friction-clutch, the combination, with the hub having the double inclines and ribs, as shown, the rolls and springs, of a hand-wheel situated centrally around the hub and adapted to have a limited movement thereon independent thereof, and provided with lateral projections adapted to rest between the rolls, casings, or shells covering the rolls and hub on opposite sides of the hand-wheel, and means for moving one of said shells backward and forward, as described.

6. The combination, with a hub, rolls, and springs constructed and arranged as shown, of the hand-wheel having lateral projections on opposite sides thereof, which rest between the rolls and the casing H and H', the former being rigidly secured to a suitable base and adapted to prevent back movement, and the latter loosely placed over the rolls and hub on one side of the hand-wheel and provided with a hand-lever, by means of which it is partly rotated around the hub, all of the above parts combined and adapted to operate as described.

7. The combination, with the hub, rolls, springs, and spring-catch, of the shells or casings H H', and the hand-wheel provided with the lateral projections and notches, all of the above parts combined and adapted to operate as described.

8. The combination, with the knees A, provided with rack-bars, the collars provided with pinions, the main shaft and set-screws for binding the sleeves to the main shaft, of the clutch F, constructed substantially as described and secured on the main shaft in any desired manner, for the purpose of moving the knees forward or backward, as necessity demands.

In testimony whereof I have signed this specification in the presence of two subscribing witnesses.

FRANCIS P. HUYCK.

Witnesses:
 JAY E. HALL,
 JAMES T. WHITE.